United States Patent
Miyanaga

[11] Patent Number: 5,158,339
[45] Date of Patent: Oct. 27, 1992

[54] SEAT BELT ANCHOR COVER WITH ELASTIC SECTION AND HINGE-ENGAGING HOOK

[75] Inventor: Yuuji Miyanaga, Akishima, Japan
[73] Assignee: Tachi-S Co., Ltd., Akishima, Japan
[21] Appl. No.: 672,397
[22] Filed: Mar. 21, 1991
[51] Int. Cl.⁵ .............................................. A47C 31/00
[52] U.S. Cl. .................................... 297/482; 297/224
[58] Field of Search ............... 297/482, 441, 457, 218, 297/224; 5/494; 24/72.5, 306, 301, 300, 302, 265 H, 601.4

[56] References Cited

U.S. PATENT DOCUMENTS

| | | | |
|---|---|---|---|
| 2,091,825 | 8/1937 | Mednick | 297/224 |
| 2,522,404 | 9/1950 | Siebelist | 297/224 |
| 2,931,084 | 4/1960 | De Witt | 24/72.5 |
| 3,695,706 | 10/1972 | Basher et al. | 297/457 X |
| 3,981,534 | 9/1976 | Wilton | 297/218 X |
| 4,783,122 | 11/1988 | Komohara | 297/482 |

FOREIGN PATENT DOCUMENTS 553652  5/1943  United Kingdom ............... 297/224

Primary Examiner—Kenneth J. Dorner
Assistant Examiner—James M. Gardner
Attorney, Agent, or Firm—Oldham, Oldham & Wilson Co.

[57] ABSTRACT

An arrangement for mounting a seat belt anchor in an automotive seat, wherein there is provided a cover to cover a hinge bracket and the seat belt anchor secured rotatably thereto, both of which are mounted on the lateral wall of a seat cushion of the seat, thereby retaining an aesthetically good state of the seat. The cover is at one edge sewn to the lateral wall of the seat cushion and at its rearward end provided with an anchoring member to be secured to the rearward edge of the hinge bracket.

11 Claims, 5 Drawing Sheets

SEAT BELT ANCHOR COVER WITH ELASTIC SECTION AND HINGE-ENGAGING HOOK

FIELD OF THE INVENTION

The present invention relates to an arrangement for mounting a seat belt anchor in an automotive seat, and particularly to the arrangement wherein the seat belt anchor is mounted to a hinge bracket fixed to the lateral wall of a seat cushion in automotive seat.

DESCRIPTION OF PRIOR ART

FIG. 1 illustrates an example of conventional seat-belt anchor mounting arrangement in an automotive seat. Designations (SC) and (1) denote a seat cushion and a hinge bracket provided on the lateral wall of the seat cushion, respectively. Although not shown, the seat cushion (SC) comprises a frame, a foam padding and a covering surface (a), the hinge bracket (1) is fixed to the frame within the seat cushion (SC), and a seat back is pivotally connected to the upper end of the hinge bracket (1).

As can be seen by the phantom lines, a seat belt anchor (2) is at its lower end secured to the hinge bracket (1) by means of a screw (7).

In this particular construction, there is defined a loose area (a3-1) in the lateral side cover section (a3) of a covering surface (a). The loose area (a3-1) is provided with an upper opening and a lower opening, so that the seat belt anchor can be inserted through the upper opening into within the loose area (a3-1), whereas on the other hand, by turning upwards the edge of lower opening as shown, the lower end part of the anchor (2) is exposed for access of the screw (7) thereto, and the anchor (2) is secured by the screw (7) to the hinge bracket (1).

However, by reason of the loose nature of the area (a3-1) in question, a slacked state and unpleasant creases are created there, resulting in an aesthetically poor appearance of the seat. Further, insertion of the anchor (2) into the opening in such loose area (a3-1) makes troublesome the assemblage involved and also makes it difficult to locate the anchor (2) precisely at the mounting area in the hinge bracket (1a).

SUMMARY OF THE INVENTION

It is a purpose of the present invention to provide an improved arrangement for mounting a seat belt anchor in an automotive seat, which permits easy mounting of the seat belt anchor and prevents creation of unpleasant slack or crease on the seat.

For such purpose, according to the present invention, there is provided a cover which covers a hinge bracket fixed at the lateral wall of a seat cushion as well as the lower end part of the seat belt anchor, such that the forward end of the cover is fixedly attached to the seat cushion lateral wall and the rearward end thereof is secured in an anchoring way to the hinge bracket.

Accordingly, since the hinge bracket, in contrast to the prior art, is fixed to the normal seat cushion over which a surface covering is affixed, the seat belt anchor is easily secured to the hinge bracket, without interference of the surface covering, while locating the anchor precisely at a given mounting area in the bracket, after which the cover is stretched over both hinge bracket and seat belt anchor in uniform way. Thus, there is no creation of slack or crease in the outer surfaces of the seat.

In one aspect of the invention, an opening is defined between the upper edge of the cover and upper corner edge of the seat cushion, whereby the seat belt anchor is rotatable freely, and smoothly in that opening.

In another aspect of the invention, a slantwise-cut opening is formed in the cover such that its inclination generally conforms to the circumference of a circle along which the seat belt anchor is rotated about its rotation center, and further that the opening is disposed adjacent to a lower base end of the seat belt anchor. This effectively reduces the rotation range of the anchor within the opening and thus makes as small as possible the size of the opening, which contributes to avoiding the crease or slack in the seat.

DETAILED DESCRIPTION OF PREFERRED EMBODIMENTS OF THE INVENTION

First of all, in the descriptions hereinafter, several embodiments will be described as applied to the seat cushion (SC) of the aforementioned prior art with the hinge bracket (1) and the seat belt anchor (2) provided thereon. Hence, all like designations to be used in the following descriptions correspond to all like ones given in the prior art description above, and specific explanation on the common and same parts is deleted for the sake of simplicity.

Figure 1:
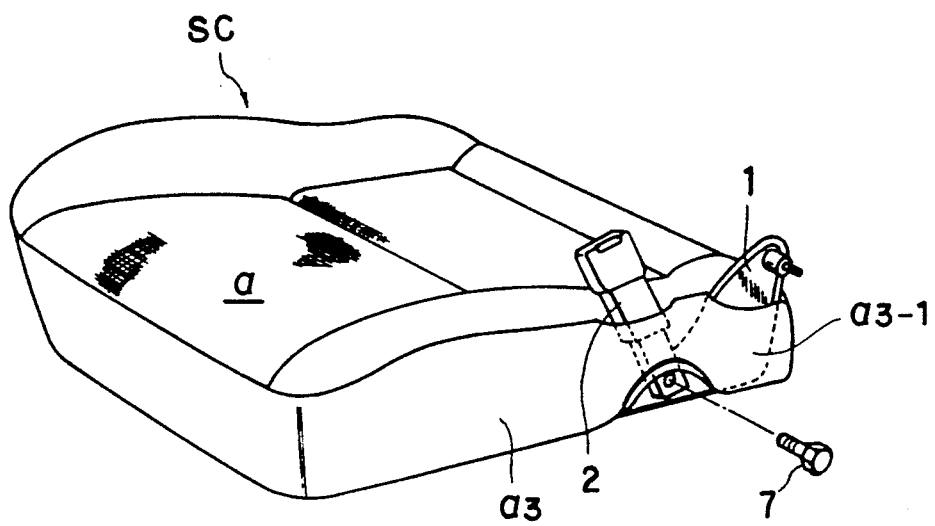
FIG. 1 is a perspective view of a seat cushion to which is applied a conventional seat belt anchor mounting arrangement.
Figure 2:
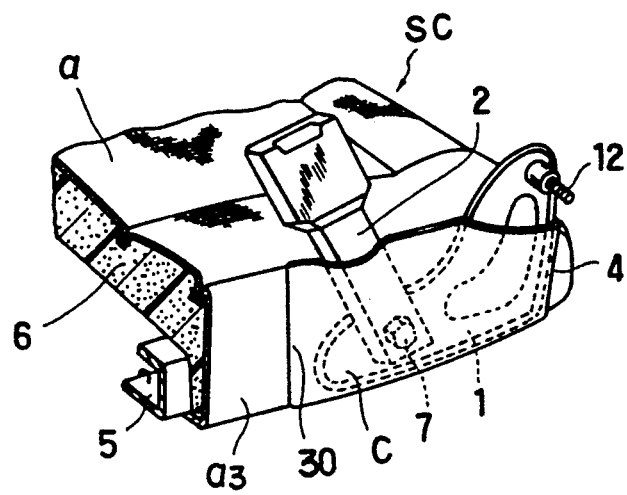
FIG. 2 is a partly broken perspective view of a principal part of a seat belt anchor mounting arrangement in accordance with the present invention, which shows a first embodiment thereof.
Figure 3:
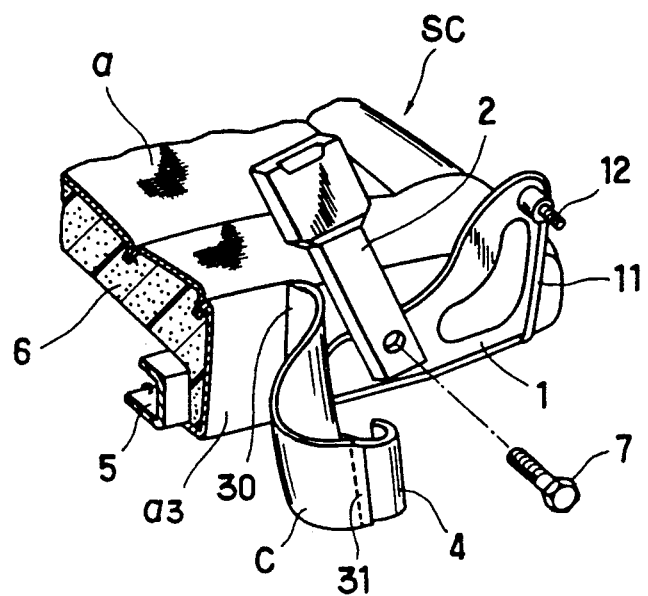
FIG. 3 is a partly broken, exploded perspective view of the same arrangement as in the FIG. 2.
Figure 4:
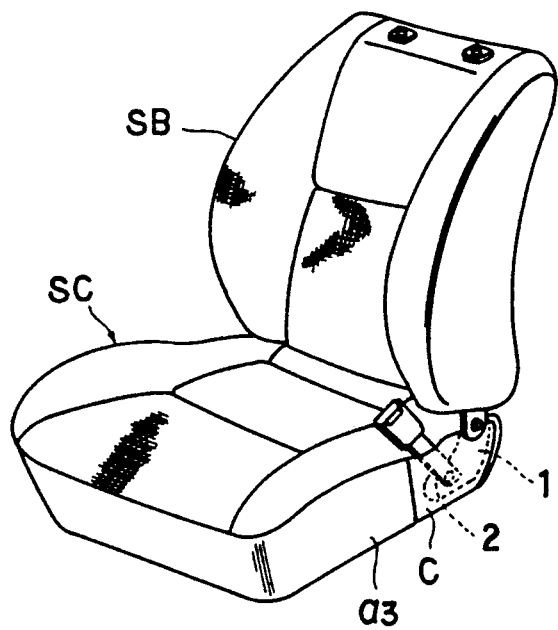
FIG. 4 is a perspective view of an automotive seat to which the first embodiment of the present invention is applied.

FIGS. 2 to 4 illustrate a first embodiment of seat belt mounting arrangement for an automotive seat in accordance with the present invention.

In this embodiment, the hinge bracket (1) is attached onto the lateral side cover section (a3) of the covering surface (a) and fixed to the frame (5) through the layer of that cover section (a3) and foam padding (6).

Under such structure, a cover (C), which is made of a same material with that of the covering surface (a), is attached to the lateral side cover section (a3). Specifically, the cover (C) is at its forward end (30) sewn to the lateral side cover section (a3) in the neighborhood of the hinge bracket (1), while the rearward end (31) of the cover (C) is sewn with a hook anchoring member (4). As shown, the cover (C) is dimensioned such that its height is equal to that of the lateral wall of the seat cushion (SC) and its length extends from the sewn point at (30) to the rearward vertical edge (11) of the hinge bracket (1). Accordingly, the cover (C) can be stretched over the bracket (1) along its longitudinal direction and anchored at its hook anchoring member (4) over the hinge bracket edge (11). As can be seen from FIGS. 3 and 2, the seat belt anchor (2) is secured by the screw to the hinge bracket (1), and then the cover (C) is stretched over the seat belt anchor (2) and bracket (1), with its anchoring member (4) being anchored over the rearward edge (11) of the bracket (1).

It is to be appreciated that the cover (C) per se is uniformly stretched, covering the seat belt anchor (2) and hinge bracket (1), whereby there is no creation of slack and crease in that particular area, thus retaining an aesthetically better appearance of the seat, that the seat belt anchor (2) is easily mounted to the hinge bracket (1) without interference of the cover (C), permitting a precise locating of the anchor (2) at a given mounting area in the bracket (1), in contrast to the foregoing prior art, and that, after having stretched the cover (C) over the thus-mounted seat belt anchor (2), there is defined an opening at (X) between the upper edge of cover (C) and upper corner edge of the seat back (SC) along their longitudinal directions, whereby the anchor (2) is allowed to be rotated freely in a wide range within the opening and an occupant can easily adjust the position for tightening the seat belt (not shown) on his or her own body. In addition, the connection between the anchor (2) and bracket (1) is completely concealed from view.

Designation (12) stands for a hinge pin for connection with a lower bracket of a seat back (SB), as seen in FIG. 4, so that the seat back (SB) can be inclined forwardly and backwardly about the hinge pin (12) relative to the seat cushion (SC).

Figure 5:
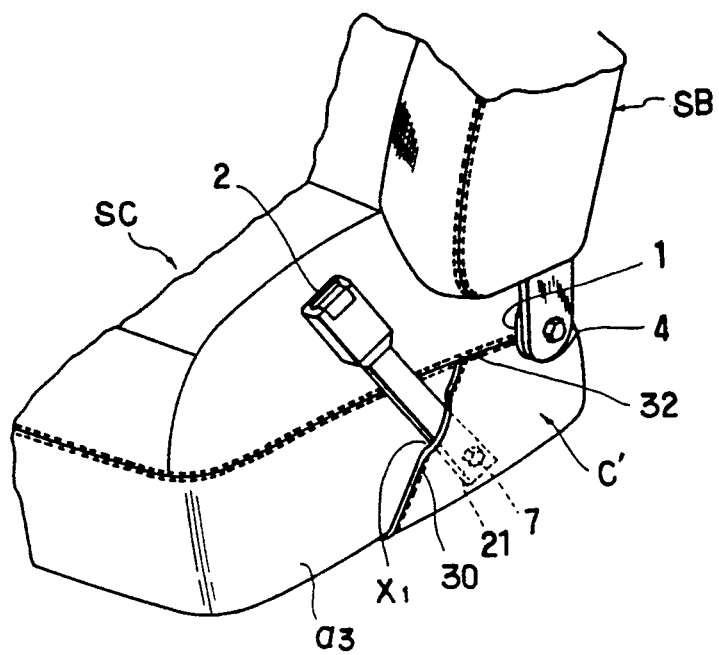
FIG. 5 is a partly broken perspective view of a second embodiment of the invention.
Figure 6:
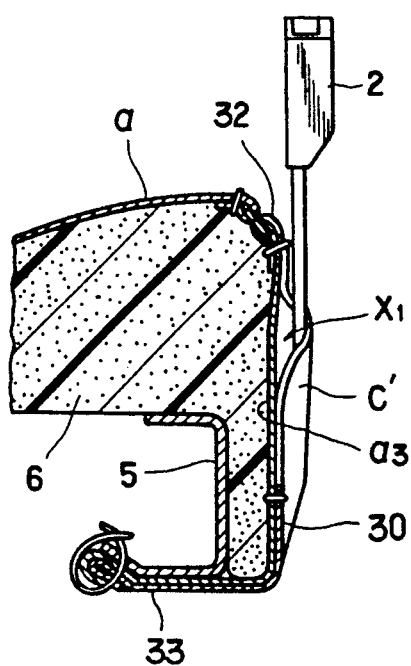
FIG. 6 is a partly broken sectional view of the second embodiment in FIG. 6.

FIGS. 5 and 6 illustrate a second embodiment of the present invention, according to which, there is provided a cover (C') having a slantwise cut forward end (31') and the hook anchoring member (4) likewise in the above first embodiment. The point different from the first embodiment resides in such cover construction, and all other elements of the present second embodiment are the same with those of the first one.

The cover (C') in this particular embodiment is sewn to the lateral side cover section (a3) of the covering surface (a) in such a manner that its slant forward end (31') is sewn thereto, excepting the area at (X1), to thereby define an opening (X1) at a part of the slant end (31'), and its upper longitudinal edge (32) is sewn along the upper corner of the seat cushion (SC), while its lower edge (33) is not sewn to the seat cushion (SC) but secured to the frame (5) by means of a hog ring or the like.

The slantwise cut end (31') of the cover (C') extends slant from the top side to lower side of the seat cushion (SC) in a direction conforming generally to the circumference of a circle along which the seat belt anchor (2) is rotated relative to its rotation center at (7) and thus the opening (X1) assumes such slant state to allow smooth, free rotation of the anchor (2) within the opening (X1). The opening (X1) should be defined as close as possible to the lower base end (21) of the anchor (2), so that the size of the opening (X1) is made as small as possible and the cover (c') is assuredly devoid of slack or creases which may be created due to that opening (X1). This can be materialized because the lower part of the anchor (2) adjacent the base part (12) presents its very small rotation range as compared with the upper part of the same distant from the base part (12).

As similar to the first embodiment, the cover (c') is at its rearward end provided with the hook anchoring member (4) to be anchored over the rearward edge (11) of the hinge bracket (1).

With the above arrangement, the manner in which the seat belt anchor (2) is mounted to the seat cushion (SC) is such that, at first, the base end (21) of the seat belt anchor (2) is inserted into the opening (X1), then, the non-sewn edges of the cover (c'), excepting the slant end (31) and upper end (32), are turned upwardly to make visible the base end (21) at the mounting area of the hinge bracket (1), and that base end (21) is secured by means of screw (7) thereto, after which, the hook anchoring member (4) is anchored over the rearward edge (11) of the bracket (1) and the lower longitudinal end (33) is secured to the frame (5).

Figure 7:
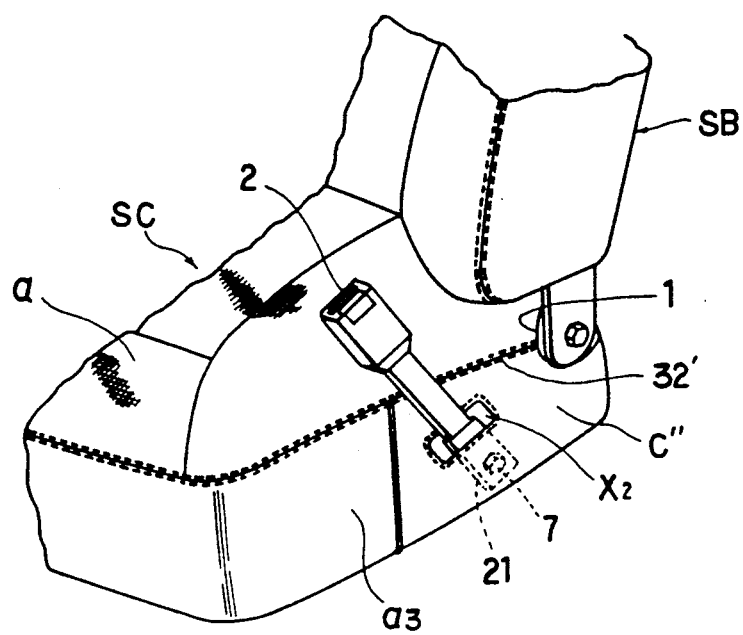
FIG. 7 is a partly broken perspective view of a third embodiment of the invention.
Figure 8:
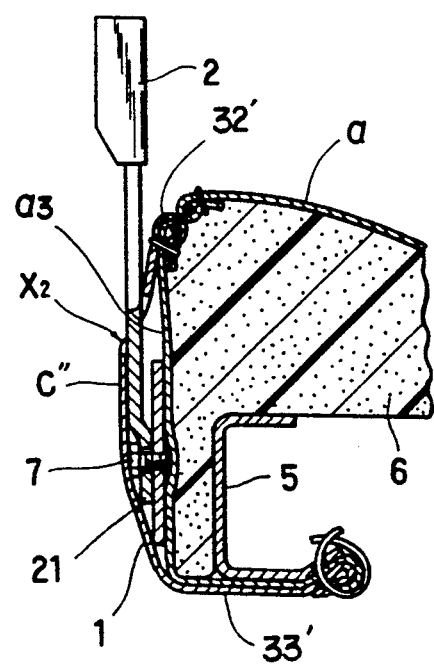
FIG. 8 is a partly broken sectional view of the third embodiment in FIG. 7.
Figure 9:
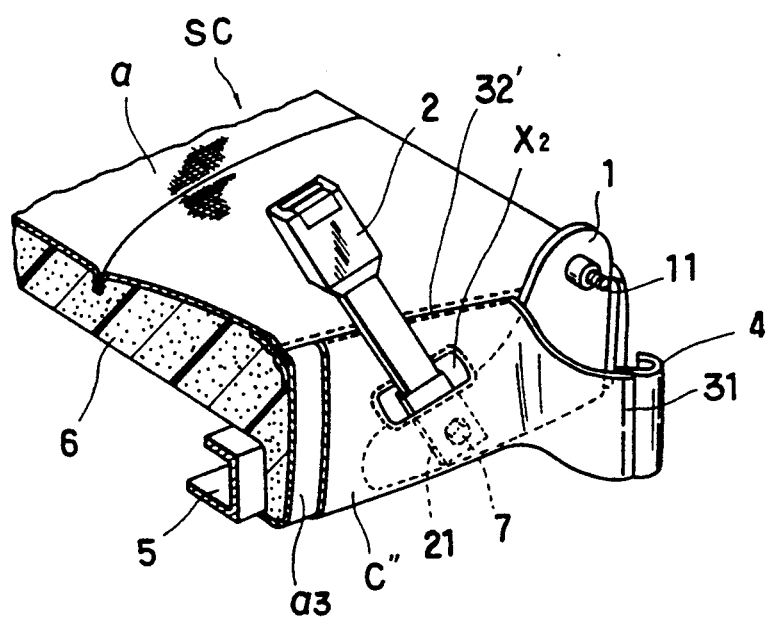
FIG. 9 is a partly broken, partly exploded perspective view of a principal part of the third embodiment.

FIGS. 7 to 9 illustrate a third embodiment of the present invention, wherein there is provided further different cover (c'') identical basically to that (C) of the foregoing first embodiment, except that an elongated opening (X2) is formed in the cover (c'') such as to assume a slant state in a direction conforming generally to the circumference of a circle along which the seat belt anchor (2) is rotated about its rotation center at (7) and disposed adjacent to the base end (21) of the anchor (2), and further except that the cover (c'') is sewn at its upper longitudinal end (32') to the upper corner edge of the seat back (SC) and secured at its lower longitudinal end (33') to the frame (4) by means of a hog ring or the like.

In this third embodiment, the manner for mounting the seat belt anchor (2) to the bracket is such that at first, the base end (21) of the anchor (2) is inserted through the opening (X2), then the cover (c'') is turned upwardly about the line at (32') to make visible that base end (21) at the mounting area in the bracket (1), and by means of the screw (7) the anchor base end (21) is secured thereto, after which, the hook anchoring member (4) and lower end (33') of the cover (c'') are, respectively, anchored to the hinge bracket rearward edge (11) and secured to the frame (5) by a hog ring or the like.

Similar to the second embodiment, the opening (X2) can be made as small as possible, so as to avoid creation of slack or crease on the surface of the cover (c'') in a more assured manner.

As a further aspect of the invention, although not shown, an opening identical to that (X2) in the above third embodiment may be formed in the lateral side cover section (a3) of covering surface (a), in which case, a cover slightly smaller in size than those in the foregoing three embodiments is interposed between the inner surface of the lateral side cover section (a3) and corresponding wall of padding (6).

While having described the invention as above, it should be understood that it is not limited to the illustrated embodiments but any other modifications, replacements and additions may structurally be possible without departing from the scope and spirit of the appended claims.

What is claimed is:

1. An arrangement for mounting a seat belt anchor in an automotive seat, wherein said seat includes a seat back and a seat cushion, said seat cushion being formed by a cushion member and a surface covering affixed over said cushion member, wherein a hinge bracket is fixed at a rearward part of a lateral wall of said seat cushion, such that said hinge bracket is disposed upon a corresponding lateral wall section of said surface covering, said hinge bracket being adapted for pivotally connecting said seat back to said seat cushion, and wherein said seat belt anchor is secured rotatably upon said hinge bracket, and wherein an auxiliary cover means is at a forward end thereof fixed by sewing to said lateral wall section of said surface covering, while being at a rearward end thereof provided with a hook-like securing means to be engageable with a rearward end of said hinge bracket.

thereby allowing said auxiliary cover means to cover both said hinge bracket and a lower portion of said seat belt anchor.

2. The arrangement as defined in claim 1, wherein said auxiliary cover means comprises a strip of cover member, wherein said strip of cover member is at its forward end sewn to a lateral side cover section of said surface covering which lies on said lateral wall of said seat cushion.

3. The arrangement as defined in claim 2, wherein said auxiliary cover means comprises a cover so dimensioned to stretchably enclose said hinge bracket and said lower portion of said seat belt anchor along a longitudinal direction of said seat cushion.

4. The arrangement as defined in claim 2, wherein said strip of cover member is made of a same material with that of said surface covering.

5. The arrangement as defined in claim 1, wherein said auxiliary cover means comprises a strip of cover member, wherein a forward end of said cover member is formed in a slantwise-cut manner, which includes a non-sewn part forming said opening portion through which said seat belt anchor passes.

6. The arrangement as defined in claim 5, wherein said strip of cover member is at its upper longitudinal end sewn to an upper corner edge of said seat cushion.

7. The arrangement as defined in claim 5, wherein said slantwise-cut forward end of said cover means extends in a direction conforming generally to a circumference of a circle along which said seat belt anchor is rotated relative to its rotation center on said hinge bracket, and wherein said slantwise-cut forward end of said cover means is disposed adjacent to a lower base end of said seat belt anchor.

8. The arrangement as defined in claim 1, wherein said opening portion is formed in said auxiliary cover means in a slant manner, and wherein an upper end of said auxiliary cover means is sewn to an upper corner edge of said seat cushion.

9. The arrangement as defined in claim 8, wherein said auxiliary cover means comprises a strip of cover member whose lower longitudinal end is secured to a frame provided in said seat cushion.

10. The arrangement as defined in claim 8, wherein said slant opening formed in said cover means lies in a direction generally conforming to a circumference of a circle along which said seat belt anchor is rotated relative to its rotation center on said hinge bracket, and wherein said slant opening is disposed adjacent to a lower base of said seat belt anchor.

11. The arrangement as defined in claim 8, wherein said slant opening is formed on a lateral side cover section of said surface covering which covers the lateral wall of said seat cushion, wherein said cover means is disposed between said lateral side cover section and said lateral wall of said seat cushion.

* * * * *